(12) United States Patent
Zhou et al.

(10) Patent No.: US 10,733,919 B1
(45) Date of Patent: Aug. 4, 2020

(54) SELF LUMINOUS SIGN

(71) Applicants: Bo Zhou, Shandong (CN); Kaikai Zhou, Shandong (CN)

(72) Inventors: Bo Zhou, Shandong (CN); Kaikai Zhou, Shandong (CN)

(*) Notice: Subject to any disclaimer, the term of this patent is extended or adjusted under 35 U.S.C. 154(b) by 59 days.

(21) Appl. No.: 16/257,055

(22) Filed: Jan. 24, 2019

(51) Int. Cl.
*G09F 13/04* (2006.01)
*C09K 11/08* (2006.01)
*C09K 11/02* (2006.01)
*F21V 7/04* (2006.01)

(52) U.S. Cl.
CPC .............. *G09F 13/04* (2013.01); *C09K 11/02* (2013.01); *C09K 11/0838* (2013.01); *F21V 7/04* (2013.01); *G09F 2013/0445* (2013.01)

(58) Field of Classification Search
CPC .................................. C09K 11/02; F21V 7/04
USPC .......................................................... 428/212
See application file for complete search history.

(56) References Cited

U.S. PATENT DOCUMENTS

2001/0010367 A1* 8/2001 Burnell-Jones ...... C09K 11/584
252/301.36

* cited by examiner

*Primary Examiner* — Betelhem Shewareged

(57) ABSTRACT

A self luminous sign, having an aluminum board, an aluminum frame and at least one luminous module; the luminous module is attached on the aluminum board, and the aluminum board is mounted to the aluminum frame; each luminous module comprises the following components: resins, luminous powder coated with silane coupling agent, antioxidants and UV absorbents in a mass percentage of 100:(30-300):(0.01-10):(0.01-10).

5 Claims, 1 Drawing Sheet

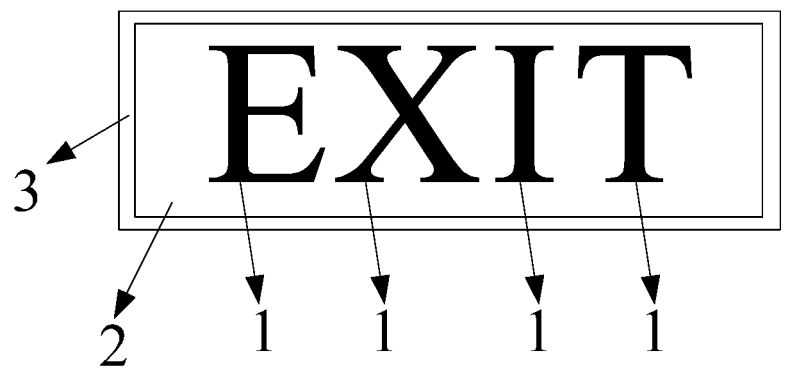

SELF LUMINOUS SIGN

BACKGROUND OF THE INVENTION

The present invention relates to the field of escape signs during fire and emergency situations, and more particularly relates to a kind of self luminous sign.

In the prior art, night-glowing signs are usually made by mixing and blending luminous powder into printing/spraying inks/paints, and then printing/spraying the required night glow logo on an ordinary baseboard. Alternatively, a luminous film or a luminous board is used as the baseboard, and the required logo is printed thereon. These are the relatively more common ways of making a luminous sign in the market. Since the luminous powder can emit a more gentle light by converting the lights being absorbed, a night-glowing sign can continue to illuminate in the dark or in case of emergency without relying on electricity to indicate an escape direction.

However, luminous powder is characterized by emitting highly bright light at the initial stage after absorbing lights, but the brightness reduces in a rapid speed, after a few minutes, brightness will be reduced down to a low level and from where the brightness continues to further reduce gradually. A luminous layer of an ordinary night-glowing sign is only about 100-500 um, wherein an amount of luminous powder is insufficient, and the stored energy is less. The sign is not bright enough in 10 minutes, 30 minutes or 60 minutes after an emergency situation. In order to illuminate with sufficient brightness, an ordinary night-glowing sign has to be coated with a thicker luminous layer, thereby increasing the production costs significantly. When the thickness is increased to 500 urn, the brightness of the sign reaches an upper limit and cannot be continued to increase significantly.

BRIEF SUMMARY OF THE INVENTION

In view of the aforesaid disadvantages now present in the prior art, the present invention is provided.

A self luminous sign, comprising an aluminum board, an aluminum frame and at least one luminous module; the luminous module is attached on the aluminum board, and the aluminum board is mounted to the aluminum frame; each luminous module comprises the following components: resins, luminous powder coated with silane coupling agent, antioxidants and UV absorbents in a mass percentage of 100:(30-300):(0.01-10):(0.01-10).

Preferably, the resins comprise at least one of the following: Phenolic resin, epoxy resin, melamine resin, unsaturated polyester resin and acrylic resin.

Preferably, the luminous powder is light-storing pigment powder formed by long-afterglow luminous powder made of aluminosilicates and coated with silane coupling agent.

Preferably, a surface of the aluminum board forming the self luminous sign is pretreated by plastic spray or white coating.

Preferably, the aluminum board has a thickness of 0.1-2 mm.

Preferably, each of the luminous modules is made according to the following steps: mixing and blending evenly all of the components of the luminous module to form a mixture, pouring the mixture into a mold of a heat press, heat pressing the mixture for 60-150 seconds at a temperature of 120-200° C. and a pressure of 100 T-500 T, thereby resulting in a cured and formed luminous module.

Preferably, a back side of each of the luminous modules is attached with double sided adhesive tapes, for example those manufactured by the 3M company.

The present invention has the advantages of high initial brightness and sufficiently bright afterglow.

BRIEF DESCRIPTION OF THE DRAWINGS

FIG. 1 is a schematic structural illustration of a self luminous sign according to the embodiments of the present invention.

DETAILED DESCRIPTION OF THE INVENTION

The present invention is further described in detail below with reference to the figures and the following embodiments.

Embodiment 1

As shown in FIG. 1, a self luminous sign comprises an aluminum board 2, an aluminum frame 3 and luminous modules 1 attached on predetermined installation positions; the aluminum board 2 is mounted to the aluminum frame 3; each of the luminous modules 1 comprises the following components: resins, luminous powder coated with silane coupling agent, antioxidants and UV absorbents in a mass percentage of 100:30:0.01:0.01.

Printing non-luminous patterns of the sign as well as the installation positions of the luminous modules 1 on the aluminum board 2, and then attaching adhesives to a back side of each of the luminous modules 1, and adhering the luminous modules 1 on the aluminum board 2 at the installation positions as printed, finally mounting the aluminum board 2 to the aluminum frame 3.

In the embodiment, the resins comprise at least one of the following: Phenolic resin, epoxy resin, melamine resin, unsaturated polyester resin and acrylic resin.

In the embodiment, the luminous powder is light-storing pigment powder formed by long-afterglow luminous powder made of aluminosilicates and coated with silane coupling agent.

In the embodiment, a surface of the aluminum board 2 forming the self luminous sign is pretreated by plastic spray or white coating.

In the embodiment, the aluminum board 2 has a thickness of 0.1-2 mm.

In the embodiment, each of the luminous modules 1 is made according to the following steps: mixing and blending evenly all of the components of the luminous module 1 to form a mixture, pouring the mixture into a mold of a heat press, heat pressing the mixture for 150 seconds at a temperature of 120° C. and a pressure of 100 T, thereby resulting in a cured and formed luminous module 1.

In the embodiment, the adhesives attached to the back side of each of the luminous modules 1 are double sided adhesive tapes, for example those manufactured by the 3M company.

Embodiment 2

A self luminous sign, comprising an aluminum board 2, an aluminum frame 3 and luminous modules 1 attached on predetermined installation positions on the aluminum board 2; the aluminum board 2 is mounted to the aluminum frame 3; each of the luminous modules 1 comprises the following components: resins, luminous powder coated with silane coupling agent, antioxidants and UV absorbents in a mass percentage of 100:300:10:10.

Printing non-luminous patterns of the sign as well as the installation positions of the luminous modules 1 on the aluminum board 2, and then attaching adhesives to a back side of each of the luminous modules 1, and adhering the luminous modules 1 on the aluminum board 2 at the installation positions as printed, finally mounting the aluminum board 2 to the aluminum frame 3.

In the embodiment, the resins comprise at least one of the following: Phenolic resin, epoxy resin, melamine resin, unsaturated polyester resin and acrylic resin.

In the embodiment, the luminous powder is light-storing pigment powder formed by long-afterglow luminous powder made of aluminosilicates and coated with silane coupling agent.

In the embodiment, a surface of the aluminum board 2 forming the self luminous sign is pretreated by plastic spray or white coating.

In the embodiment, the aluminum board 2 has a thickness of 0.1-2 mm.

In the embodiment, each of the luminous modules 1 is made according to the following steps: mixing and blending evenly all of the components of the luminous module 1 to form a mixture, pouring the mixture into a mold of a heat press, heat pressing the mixture for 60 seconds at a temperature of 200° C. and a pressure of 500 T, thereby resulting in a cured and formed luminous module 1.

In the embodiment, the adhesives attached to the back side of each of the luminous modules 1 are double sided adhesive tapes, for example those manufactured by the 3M company.

Embodiment 3

A self luminous sign, comprising an aluminum board 2, an aluminum frame 3 and luminous modules 1 attached on predetermined installation positions on the aluminum board 2; the aluminum board 2 is mounted to the aluminum frame 3; each of the luminous modules 1 comprises the following components: resins, luminous powder coated with silane coupling agent, antioxidants and UV absorbents in a mass percentage of 100:165:5:5.

Printing non-luminous patterns of the sign as well as the installation positions of the luminous modules 1 on the aluminum board 2, and then attaching adhesives to a back side of each of the luminous modules 1, and adhering the luminous modules 1 on the aluminum board 2 at the installation positions as printed, finally mounting the aluminum board 2 to the aluminum frame 3.

In the embodiment, the resins comprise at least one of the following: Phenolic resin, epoxy resin, melamine resin, unsaturated polyester resin and acrylic resin.

In the embodiment, the luminous powder is light-storing pigment powder formed by long-afterglow luminous powder made of aluminosilicates and coated with silane coupling agent.

In the embodiment, a surface of the aluminum board 2 forming the self luminous sign is pretreated by plastic spray or white coating.

In the embodiment, the aluminum board 2 has a thickness of 0.1-2 mm.

In the embodiment, each of the luminous modules 1 is made according to the following steps: mixing and blending evenly all of the components of the luminous module 1 to form a mixture, pouring the mixture into a mold of a heat press, heat pressing the mixture for 100 seconds at a temperature of 160° C. and a pressure of 300 T, thereby resulting in a cured and formed luminous module 1.

In the embodiment, the adhesives attached to the back side of each of the luminous modules 1 are double sided adhesive tapes, for example those manufactured by the 3M company.

The object, technical solutions and beneficial effects of the present invention are described in detail above with reference to the embodiments. It should be understood that, the embodiments of the present invention as described above are not intended to limit the scope of protection of the present invention. Any changes, modifications or alternative configurations achieving the same technical effects made within the spirits and principles of the present invention should also fall within the scope of protection of the present invention.

What is claimed is:

1. A self luminous sign, comprising an aluminum board, an aluminum frame and at least one luminous module;
    the luminous module is attached on the aluminum board, and the aluminum board is mounted to the aluminum frame;
    each luminous module comprises the following components: resins, luminous powder coated with silane coupling agent, antioxidants and UV absorbents in a mass percentage of 100:(30-300):(0.01-10):(0.01-10).

2. The self luminous sign of claim 1, wherein the resins comprise at least one of the following: phenolic resin, epoxy resin, melamine resin, unsaturated polyester resin and acrylic resin.

3. The self luminous sign of claim 1, wherein the luminous powder is light-storing pigment powder formed by luminous powder made of aluminosilicates and coated with silane coupling agent.

4. The self luminous sign of claim 1, wherein a surface of the aluminum board forming the self luminous sign is pretreated by plastic spray or white coating.

5. The self luminous sign of claim 1, wherein the aluminum board has a thickness of 0.1-2 mm.

* * * * *